(12) United States Patent
Lee et al.

(10) Patent No.: US 10,500,949 B2
(45) Date of Patent: Dec. 10, 2019

(54) INTEGRATED FUEL-MIXING PREVENTION DEVICE FOR DIESEL VEHICLE

(71) Applicants: Hyundai Motor Company, Seoul (KR); Kia Motors Corporation, Seoul (KR)

(72) Inventors: Tae Suk Lee, Hwaseong-si (KR); Sung Won Lee, Hwaseong-si (KR); Tae Yoon Lee, Seoul (KR); S. Chaitanya kumar Reddy, Hyderabad (KR); Sreekanth Potlabathini, Hyderabad (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/002,962

(22) Filed: Jun. 7, 2018

(65) Prior Publication Data
US 2019/0202285 A1    Jul. 4, 2019

(30) Foreign Application Priority Data
Dec. 28, 2017   (IN) .............................. 201711047104

(51) Int. Cl.
*B60K 15/04*      (2006.01)
*B60K 15/035*     (2006.01)
*F01N 3/20*       (2006.01)

(52) U.S. Cl.
CPC ............ *B60K 15/04* (2013.01); *B60K 15/035* (2013.01); *B60K 2015/03538* (2013.01); *B60K 2015/0458* (2013.01); *F01N 3/2066* (2013.01); *F01N 2610/02* (2013.01); *F01N 2610/1413* (2013.01)

(58) Field of Classification Search
CPC ................ B05B 1/14; B60K 2015/016; B60K 2015/03118; B65G 53/56
USPC .......................... 141/350; 137/171, 172, 177
See application file for complete search history.

(56) References Cited

U.S. PATENT DOCUMENTS

| | | | | |
|---|---|---|---|---|
| 7,789,113 B2 * | 9/2010 | Stephan | ................. | B60K 15/04 141/350 |
| 2002/0134461 A1 * | 9/2002 | Furuta | .................... | B60K 15/04 141/286 |
| 2014/0332529 A1 * | 11/2014 | Ryu | ........................ | B60K 15/04 220/86.2 |

FOREIGN PATENT DOCUMENTS

| | | |
|---|---|---|
| KR | 10-1417637 B1 | 7/2014 |
| KR | 10-1481272 B1 | 1/2015 |
| KR | 10-1510051 B1 | 4/2015 |
| KR | 10-1567229 B1 | 11/2015 |
| KR | 10-2017-0029801 A | 3/2017 |
| KR | 10-2017-0079501 A | 7/2017 |
| KR | 10-2017-0115835 A | 10/2017 |
| KR | 10-1804775 B1 | 12/2017 |

* cited by examiner

*Primary Examiner* — Michael J Carey
*Assistant Examiner* — Christopher M Afful
(74) *Attorney, Agent, or Firm* — Morgan, Lewis & Bockius LLP

(57) ABSTRACT

Disclosed herein is an integrated fuel mixing prevention device for a diesel vehicle, in which a diesel filler neck and a urea filler neck are integrated with each other to prevent fuel from mixing, allowing only a diesel fuel filling gun to be inserted into a fuel inlet when a diesel fuel filling mode is selected and allowing only a urea filling gun to be inserted into the fuel inlet when a urea filling mode is selected, which may prevent a fuel mixing an accident caused by incorrect replenishment.

13 Claims, 17 Drawing Sheets

- ENLARGED VIEW OF PORTION "A" IN FIG. 8 -

- ENLARGED VIEW OF PORTION "B" IN FIG. 8 -

- ENLARGED VIEW OF PORTION "C" IN FIG. 17 -

- ENLARGED VIEW OF PORTION "D" IN FIG. 17 -

INTEGRATED FUEL-MIXING PREVENTION DEVICE FOR DIESEL VEHICLE

CROSS-REFERENCE TO RELATED APPLICATION

This application claims under 35 U.S.C. § 119(a) the benefit of priority to Indian Patent Application No. 201711047104, filed on Dec. 28, 2017, the entire contents of which are incorporated herein by reference.

BACKGROUND OF THE INVENTION

Field of the Invention

The present invention relates to an integrated fuel-mixing prevention device for a diesel vehicle, and more particularly, to an integrated fuel-mixing prevention device for a diesel vehicle, in which a diesel filler neck and a urea filler neck are integrated with each other to prevent fuel from mixing.

Description of Related Art

Conventionally, an exhaust system of a diesel engine is disposed with a selective catalytic reduction (SCR) system, which injects urea into an exhaust pipe to effectively remove nitride oxides formed therein.

The urea is decomposed into a plurality of ammonia molecules by heat of an exhaust gas, reacting with nitride oxides in the exhaust gas. Nontoxic nitrogen and water, which are reaction products, are then discharged to the outside environment.

Thus, a diesel engine (more particularly, a commercial vehicle) is disposed with a diesel fuel tank filled with diesel fuel, and a urea tank filled with urea.

Referring to FIG. 21, on a fuel inlet of a diesel vehicle, both a diesel filler neck 1, configured for filling diesel fuel, and a urea filler neck 2, configured for filling urea, are mounted.

Because both the diesel filler neck 1 and the urea filler neck 2 are mounted on the fuel inlet of the diesel vehicle, a size (e.g., 235 mm×160 mm) of the fuel inlet of the diesel vehicle is excessively increased as compared to a size of a fuel inlet of a conventional gasoline vehicle (e.g., ø is 173 mm), which causes deterioration of an external appearance.

In addition, because the diesel filler neck 1 and the urea filler neck 2 mounted separately on the fuel inlet of the diesel vehicle, the number of assembly elements and the number of assembly processes increases. In particular, there is a risk of a fuel mixing accident occurring in which urea is incorrectly replenished through the diesel filler neck 1.

The information disclosed in this Background of the Invention section is only for enhancement of understanding of the general background of the invention and should not be taken as an acknowledgement or any form of suggestion that this information forms the related art already known to a person skilled in the art.

BRIEF SUMMARY

Various aspects of the present invention are directed to providing an integrated fuel-mixing prevention device configured for a diesel vehicle, in which a diesel filler neck and a urea filler neck are integrated with each other to prevent fuel from mixing.

Various aspects of the present invention are directed to providing an integrated fuel-mixing prevention device configured for a diesel vehicle including a filler pipe having a guide wing insertion groove formed in an internal-diameter surface thereof, the filler pipe being mounted to a vehicle body, a retainer having an inlet and an outlet formed respectively in an upper end portion and a lower end portion thereof, and having a guide wing through-hole formed in an internal-diameter surface thereof, the retainer being inserted into the filler pipe to be angularly rotated, a support bracket having a guide pin formed on an upper surface thereof, the support bracket being inserted into the internal-diameter surface of the retainer to be angularly rotated with the retainer, a pair of guide wings each having a guide hole configured for insertion of the guide pin, each guide wing passing through the guide wing through-hole and being inserted into the guide wing insertion groove wherein the respective guide wings are moved away from or toward each other when the retainer and the support bracket are angularly rotated, a first stopper and a second stopper mounted on opposite side portions of the support bracket to be angularly rotated and moved forward or backward, and a flap located between the first stopper and the second stopper to be locked or unlocked, the flap performing a downward opening operation by an insertion pressure of a diesel fuel filling gun or a urea filling gun when unlocked.

In an exemplary embodiment of the present invention, each of the filler pipe and the retainer may have a lower portion having a smaller diameter than that of an upper portion thereof.

In another exemplary embodiment of the present invention, the filler pipe may be integrally provided on an upper end portion thereof with a vehicle-body assembly element, and may also be provided on opposite side surfaces thereof with a first vapor discharge pipe and a second vapor discharge pipe, which are respectively connected to a diesel leveling tube and a urea leveling tube.

In still another exemplary embodiment of the present invention, the retainer may have a vapor discharge hole formed in the internal-diameter surface thereof, the vapor discharge hole selectively communicating with the first vapor discharge pipe and the second vapor discharge pipe of the filler pipe.

In yet another exemplary embodiment, the retainer may have a character and an arrow inscribed in an upper surface thereof to guide the angular rotation of the retainer for switching between a diesel fuel filling mode and a urea filling mode.

In still yet another exemplary embodiment, the lower end portion of the retainer, provided with the outlet, may be inserted into an integrated pipe in which a diesel fuel filling pipe and a urea filling pipe are integrated with each other, and the outlet may communicate with one of the diesel fuel filling pipe and the urea filling pipe when the retainer is angularly rotated.

In a further exemplary embodiment, the internal-diameter surface of the filler pipe may be provided on opposite sides thereof with a first flange having a first slot and a second flange having a second slot, the first stopper may be provided on a lower end portion thereof with a first protrusion, which is inserted into the first slot to be angularly rotated and moved forward or backward, and the second stopper may be provided on a lower end portion thereof with a second protrusion, which is inserted into the second slot to be angularly rotated and moved forward or backward thereof.

In another further exemplary embodiment, each of the first slot and the second slot may include a first slide region, which maintains a constant distance with respect to an internal-diameter surface of each flange, a second slide region, which extends from the first slide region with a gradually increasing distance from the internal-diameter surface of each flange, and a forward/backward movement region, which extends from a trailing end portion of the first slide region.

In still another further exemplary embodiment, the support bracket may have slide grooves formed in opposite lower portions thereof, and each of the first stopper and the second stopper may have sliders integrally formed on opposite sides thereof to be movably inserted into the slide grooves in a forward or backward direction thereof.

In yet another further exemplary embodiment, the first stopper and the second stopper may be connected to each other via a connection spring, and may be surrounded by a ring spring while coming into close contact with the opposite lower portions of the support bracket.

In still yet another further exemplary embodiment, the respective guide wings may be elastically connected to each other at first end portions thereof via a first return spring and a nipple.

In a still further exemplary embodiment, the flap may have a rear end portion, which is hinged to and elastically connected via a second return spring to a lower end portion of the second stopper.

In a yet still further exemplary embodiment, the flap may have a front end portion integrally provided with a lock portion, and the first stopper may have a locking protrusion formed on a lower end portion thereof wherein the lock portion is accommodated on and locked by the locking protrusion.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for exemplary embodiment both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
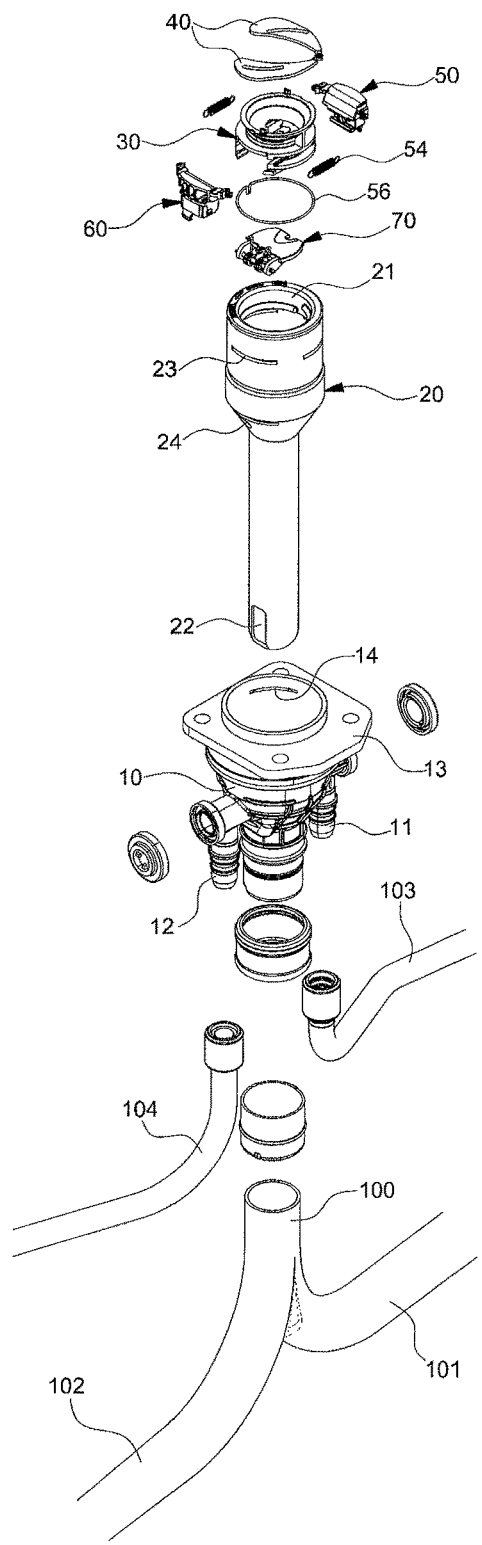
FIG. 1 is an exploded perspective view illustrating an integrated fuel-mixing prevention device configured for a diesel vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, in the description of the present invention, a detailed description of related known technologies and the like will be omitted when it is judged to make the subject of the present invention unclear.

Figure 2:
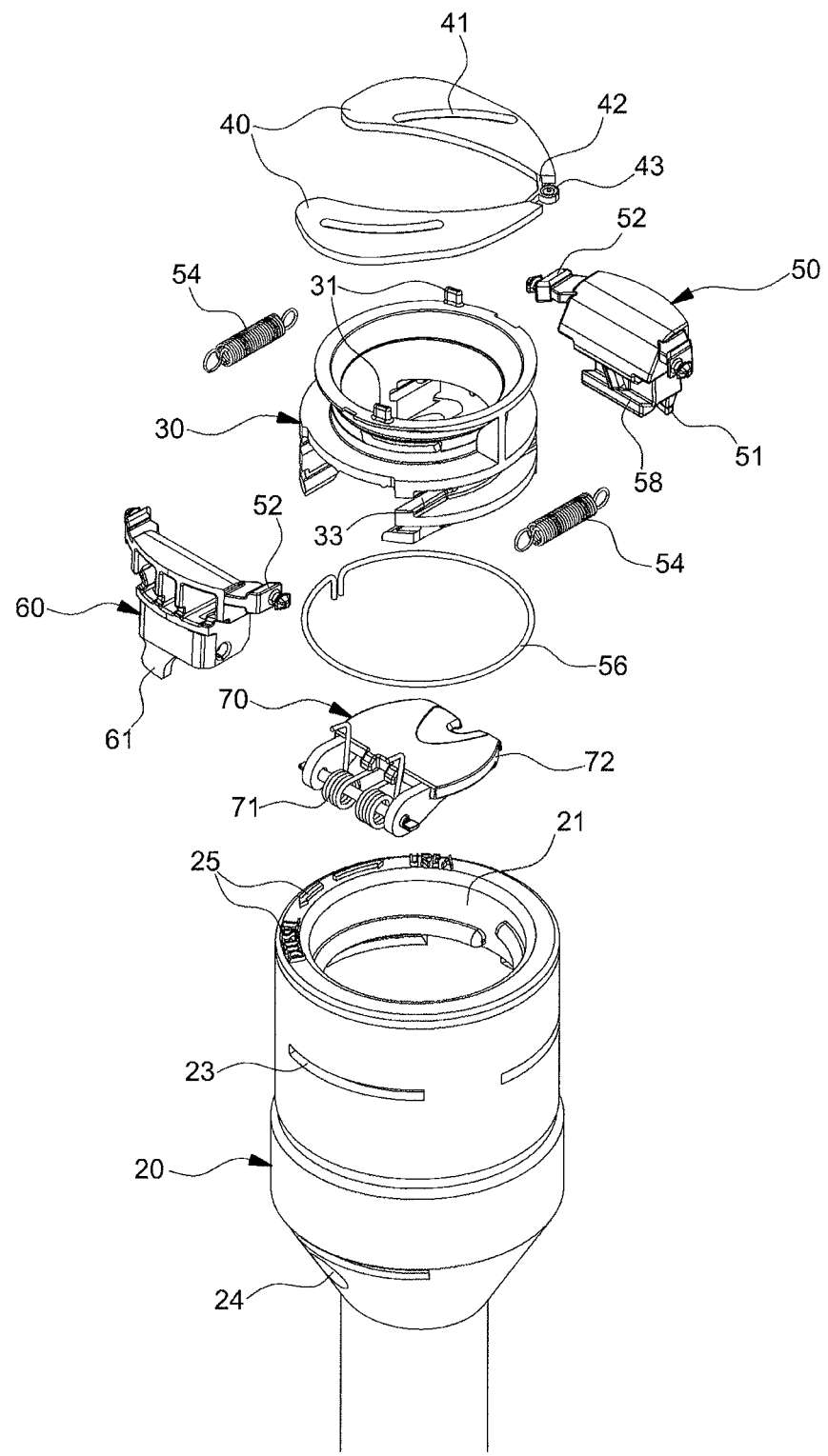
FIG. 2 is an enlarged exploded perspective view illustrating major elements of the integrated fuel-mixing prevention device configured for the diesel vehicle according to an exemplary embodiment of the present invention.
Figure 3:
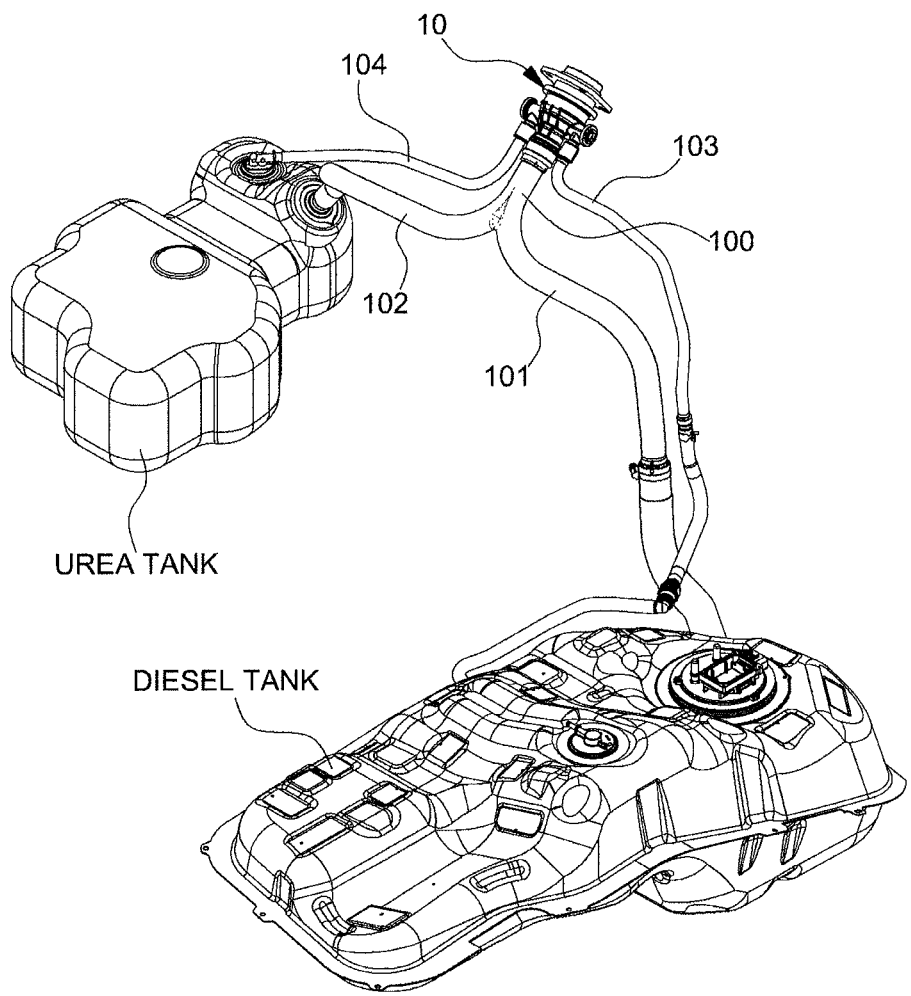
FIG. 3 is an assembled perspective view illustrating the integrated fuel-mixing prevention device configured for the diesel vehicle according to an exemplary embodiment of the present invention.

FIG. 1, FIG. 2, and FIG. 3 illustrate a configuration of an integrated fuel-mixing prevention device configured for a diesel vehicle according to an exemplary embodiment of the present invention.

In FIG. 1, FIG. 2, and FIG. 3, reference numeral 10 indicates a filler pipe.

The filler pipe 10 is an integrated framework of a diesel filler neck and a urea filler neck, and is inserted into a vehicle body at a fuel inlet position to be fixedly mounted thereto.

The filler pipe 10 is a hollow pipe, which includes an upper portion having a large diameter and a lower portion having a smaller diameter than the upper portion. On the upper end portion of the filler pipe 10, a vehicle-body assembly element 13 is integrally formed allowing the filler pipe 10 to be fixedly mounted to the vehicle body. On opposite side surfaces of the filler pipe 10, a first vapor discharge pipe 11 and a second vapor discharge pipe 12 are formed.

At the present time, the first vapor discharge pipe 11 is connected to a diesel leveling tube 103 which extends from a diesel fuel tank providing a vapor flow path therein, and the second vapor discharge pipe 12 is connected to a urea leveling tube 104 which extends from a urea tank providing a vapor flow path therein.

In addition, in opposite sides of the internal-diameter surface of the filler pipe 10, guide wing insertion grooves 14, into which external end portions of guide wings 40 are inserted, are respectively formed.

A first flange 15 having a first slot 16 and a second flange 17 having a second slot 18 are formed on opposite sides of the internal-diameter surface of the filler pipe 10 at positions lower than the positions at which the guide wing insertion grooves 14 are formed as shown in FIGS. 5-9, 11, and 12.

As seen in FIG. 9, FIG. 10, FIG. 11 and FIG. 12, each of the first slot 16 and the second slot 18 includes a first slide region S1, which maintains a constant distance with respect to the internal-diameter surface of each flange 15 or 17, a second slide region S2, which extends from the first slide region S1 with gradually increasing distance from the internal-diameter surface of each flange 15 or 17, and a forward/backward movement region S3, which extends from the trailing end portion of the first slide region S1.

Accordingly, a first protrusion 51, which is formed on the lower end portion of a first stopper 50 that will be described below, is inserted into the first slot 16 to be angularly rotated and moved forward or backward thereof. A second protrusion 61, which is formed on the lower end portion of a second stopper 60 that will be described below, is inserted into the second slot 18 to be angularly rotated and moved forward or backward thereof.

A retainer 20 is angularly, rotatably inserted into the filler pipe 10 as described above. The retainer 20 is formed as a hollow pipe which has an upper portion having a large diameter and a lower portion having a smaller diameter than the upper portion, preventing the retainer 20 from being separated downwardly from the filler pipe 10.

The retainer 20 has an inlet 21 and an outlet 22 formed respectively in the upper end portion and the lower end portion thereof, and guide wing through-holes 23 formed in opposite sides of the internal-diameter surface thereof for the insertion or separation of the respective guide wings 40. Accordingly, the retainer 20 is inserted into the filler pipe 10 to be angularly rotated.

In addition, the retainer 20 has a vapor discharge hole 24 formed in the internal-diameter surface thereof to selectively communicate with the first vapor discharge pipe 11 or the second vapor discharge pipe 12 of the filler pipe 10.

Thus, when the retainer 20 is angularly rotated in a diesel fuel filling mode direction, the vapor discharge hole 24 communicates with the first vapor discharge pipe 11, wherein vapor from the diesel fuel tank passing through the diesel leveling tube 103 then passes through the first vapor discharge pipe 11 and the vapor discharge hole 24, which communicate with each other, discharging outward through the inlet 21 in the upper end portion of the retainer 20.

In contrast, when the retainer 20 is angularly rotated in a urea filling mode direction, the vapor discharge hole 24 communicates with the second vapor discharge pipe 12 wherein vapor from the urea tank passing through the urea leveling tube 104 then passes through the second vapor discharge pipe 12 and the vapor discharge hole 24, which communicate with each other, discharging outward through the inlet 21 in the upper end portion of the retainer 20.

To allow a driver to verify the filling mode, on the upper surface of the retainer 20, for example, a plurality of characters and arrows 25 are inscribed, which guide the angular rotation direction (.g. the clockwise direction) to the diesel fuel filling mode or the angular rotation direction (e.g. The counterclockwise direction) to the urea filling mode.

In addition, the lower end portion of the retainer 20, which is provided with the outlet 22, is inserted into an integrated pipe 100 of a diesel fuel filling pipe 101 and a urea filling pipe 102. When the retainer 20 is angularly rotated in the clockwise direction or in the counterclockwise direction in the present state, the outlet 22 communicates with one of the diesel fuel filling pipe 101 and the urea filling pipe 102.

Meanwhile, a support bracket 30 having a cylindrical shape is tightly press-fitted into the retainer 20 to be angularly rotated with the retainer 20.

In addition, a pair of guide pins 31 integrally protrudes from the upper surface of the support bracket 30. The guide pins 31 cause the opening or closing operation of the two guide wings 40.

Each of the guide wings 40 has a same planar shape as a cross-sectional shape of an airfoil, and a guide hole 41 is diagonally formed in the longitudinal direction of the guide wing 40. Accordingly, when the guide wings 40 are accommodated on the upper surface of the support bracket 30, the guide pins 31 are inserted into the respective guide holes 41.

In addition, an external end portion of each guide wing 40 is inserted into the guide wing insertion groove 14 in the filler pipe 10 to be inserted into or separated from the guide wing through-hole 23 in the retainer 20.

At the present time, one end portions of the respective guide wings 40 are elastically connected to each other via a first return spring 42 and a nipple 43. Accordingly, when the guide wings 40 are moved away from each other, the first return spring 42 exerts an elastic restoration force, forcing the guide wings 40 to move toward each other.

Accordingly, when the retainer 20 is angularly rotated, wherein the support bracket 30 is also rotated at the same angle, the guide pins 31 of the support bracket 30 are moved along the guide holes 41 in the guide wings 40, causing the respective guide wings 40 to be moved away from or toward each other.

Meanwhile, when the guide wings 40 have been moved away from each other, a diesel fuel filling gun (having a diameter of approximately 24 mm to 31 mm) may pass between the guide wings 40. When the guide wings 40 have been moved toward each other, the diesel fuel filling gun (having a diameter of approximately 24 mm to 31 mm) cannot pass between the guide wings 40, and only a urea filling gun (having a diameter of approximately 19 mm) may pass between the guide wings 40.

Here, the first stopper 50 and the second stopper 60 are mounted on opposite side portions of the support bracket 30 to be angularly rotated and moved forward or backward thereof.

To the present end, slide grooves 33 are formed in opposite lower portions of the support bracket 30, and each of the first stopper 50 and the second stopper 60 are integrally provided on opposite sides thereof with sliders 52. The sliders 52 are inserted into the slide grooves 33 to move forward or backward thereof. The first stopper 50 and the second stopper 60 are connected to each other via connection springs 54.

Accordingly, when an external force for backward movement is applied to the first stopper 50 and the second stopper 60, the sliders 52 are moved backward along the slide grooves 33, and simultaneously the connection springs 54 are extended. Accordingly, the first stopper 50 and the second stopper 60 are moved backward thereof. When the external force is released, the first stopper 50 and the second stopper 60 are moved forward to the initial positions thereof by the elastic restoration force of the connection springs 54.

In addition, because the first stopper 50 and the second stopper 60 are surrounded by a ring spring 56 in the state in which they are in close contact with opposite sides of the support bracket 30, the first stopper 50 and the second stopper 60 are angularly rotated when the support bracket 30 is angularly rotated.

Here, a flap 70 is connected to the second stopper 60 to be angularly rotated. The flap 70 may be locked by the first stopper 50 to prevent downward rotation in a horizontal state thereof, or may be unlocked from the first stopper 50 to be rotated downward.

A rear end portion of the flap 70 is elastically connected to the lower end portion of the second stopper 60 via both a hinge and a second return spring 71. The front end portion of the flap 70 is integrally provided with a lock portion 72 wherein the lock portion 72 is accommodated on and locked by a locking protrusion 58 formed on the lower end portion of the first stopper 50.

Accordingly, even when a downward external force (e.g., insertion force of the urea filling gun) is applied to the flap 70 in the state in which the flap 70 remains in the horizontal state and the lock portion 72 is accommodated on and locked by the locking protrusion 58 of the first stopper 50, the flap 70 is not angularly rotated downward. In contrast, in the state in which the flap 70 remains in the horizontal state and the lock portion 72 is unlocked from the locking protrusion 58 of the first stopper 50, the flap 70 is angularly rotated downward by the downward external force (e.g., insertion force of the diesel fuel filling gun or the urea filling gun) applied thereto.

Hereinafter, the flow of operation of the diesel/urea integrated fuel-mixing prevention device according to an exemplary embodiment of the present invention having the above-described configuration will be described.

First, it is noted that, because the diameter (approximately 24 mm to 31 mm) of the diesel fuel filling gun and the diameter (approximately 19 mm) of the urea filling gun differ from each other, the diesel fuel filling gun 200 (having the diameter of approximately 24 mm to 31 mm) may pass between the guide wings 40 when the respective guide wings 40 move away from each other. When the guide wings 40 move toward each other, the diesel fuel filling gun 200 (having the diameter of approximately 24 mm to 31 mm) cannot pass between the guide wings 40, and only the urea filling gun 202 (having the diameter of approximately 19 mm) may pass between the guide wings 40.

<Diesel Fuel Filling Mode>

FIG. 4, FIG. 5, FIG. 6, FIG. 7, FIG. 8, FIG. 9, FIG. 10, FIG. 11, and FIG. 12 illustrate the operating state of a diesel fuel filling mode in the integrated fuel-mixing prevention device configured for the diesel vehicle according to an exemplary embodiment of the present invention.

Figure 4:
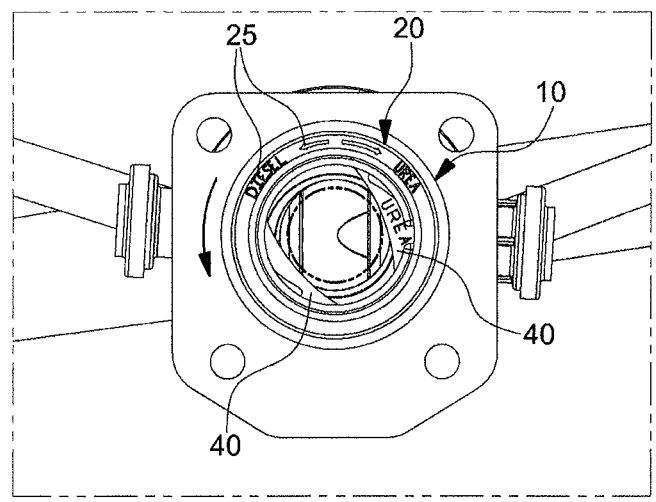
FIG. 4 is a plan view illustrating the operating state of a diesel fuel filling mode in the integrated fuel-mixing prevention device configured for the diesel vehicle according to an exemplary embodiment of the present invention.
Figure 5:
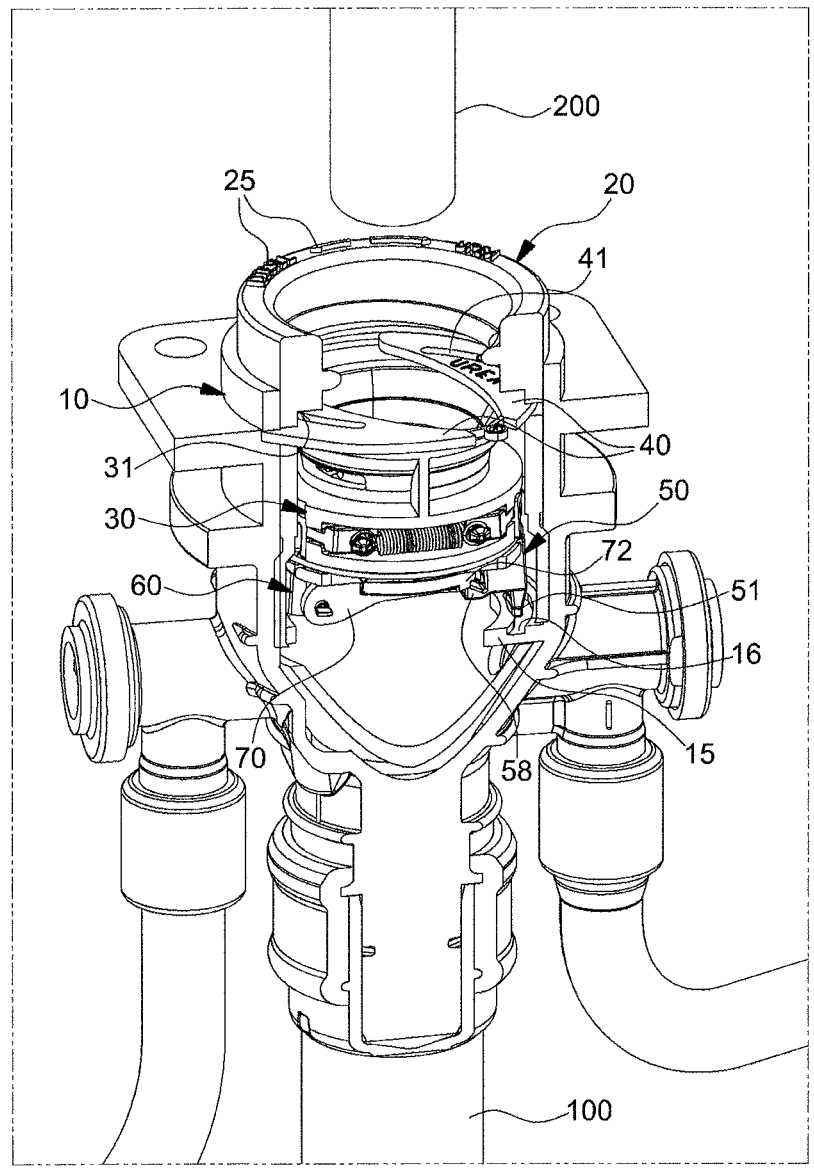
FIG. 5 is a cross-sectional view illustrating the operating state of the diesel fuel filling mode in the entire integrated fuel-mixing prevention device configured for the diesel vehicle according to an exemplary embodiment of the present invention.
Figure 6:
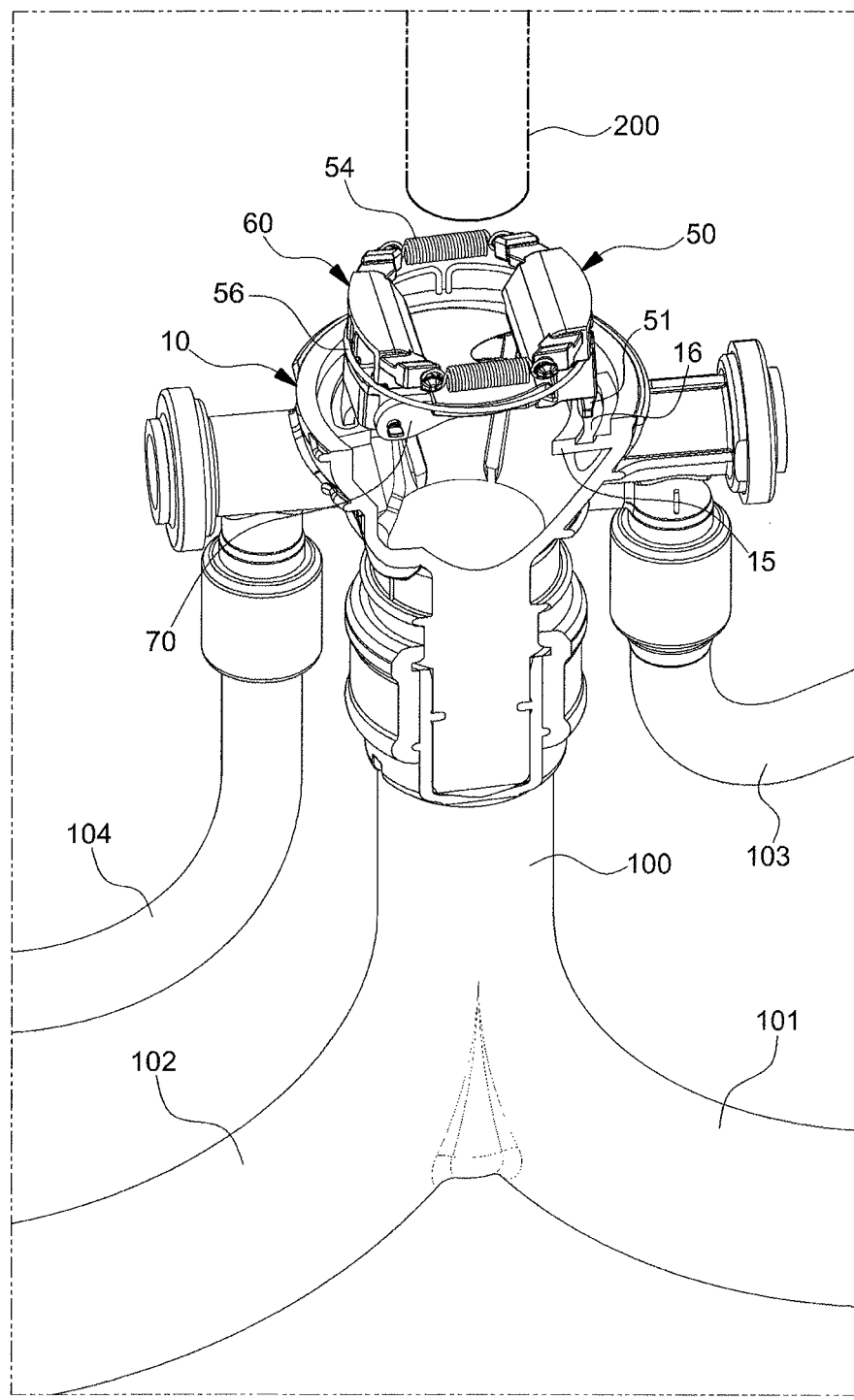
FIG. 6, FIG. 7, FIG. 8, FIG. 9, and FIG. 10 are cross-sectional views illustrating the integrated fuel-mixing prevention device configured for the diesel vehicle according to an exemplary embodiment of the present invention, from which some elements are removed to better show the operating state of the diesel fuel filling mode.

First, a driver (or the person who fills the fuel) rotates the retainer 20 in an angular rotation direction (e.g. the counterclockwise direction) to switch to the diesel fuel filling mode after checking the characters and arrows 25 formed on the upper surface of the retainer 20 (see FIG. 4).

When the retainer 20 is angularly rotated in the counterclockwise direction, the first stopper 50 and the second stopper 60, as well as the support bracket 30, are angularly rotated at the same angle.

At the present time, when the support bracket 30 is angularly rotated, the guide pins 31 of the support bracket 30 are moved outward in the guide holes 41 in the guide wings 40, causing the respective guide wings 40 to be moved away from each other. The guide wings 40 are moved away from each other until the distance therebetween reaches approximately 35 mm to allow the diesel fuel filling gun 200 (having the diameter of approximately 24 mm to 31 mm) to be inserted between the guide rings 40 (see FIG. 5 and FIG. 6).

Figure 11:
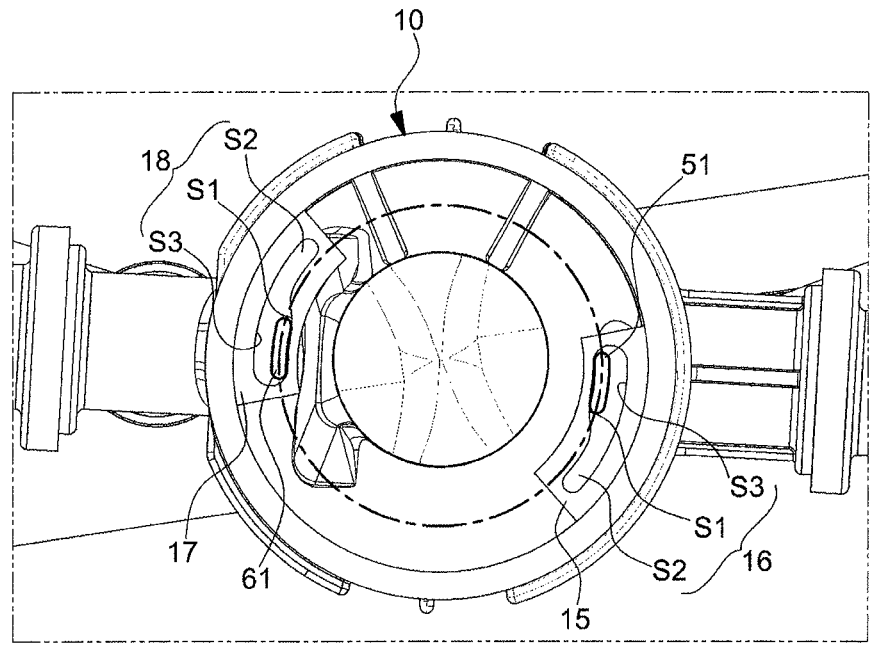
FIG. 11 and FIG. 12 are schematic plan views illustrating the positional movement of a first protrusion of a first stopper and a second protrusion of a second stopper in a first slot and a second slot, respectively, in the diesel fuel filling mode of the integrated fuel-mixing prevention device configured for the diesel vehicle according to an exemplary embodiment of the present invention.

In addition, as the first stopper 50 and the second stopper 60 are angularly rotated in the counterclockwise direction, as illustrated in FIG. 11, the first protrusion 51 formed on the lower end portion of the first stopper 50 is located in the first slide region S1 in the first slot 16, and in the same manner, the second protrusion 61 formed on the lower end portion of the second stopper 60 is located in the first slide region S1 in the second slot 18.

In addition, the flap 70 remains in the horizontal state, and the lock portion 72 remains accommodated on and locked by the locking protrusion 58 of the first stopper 50.

Figure 7:
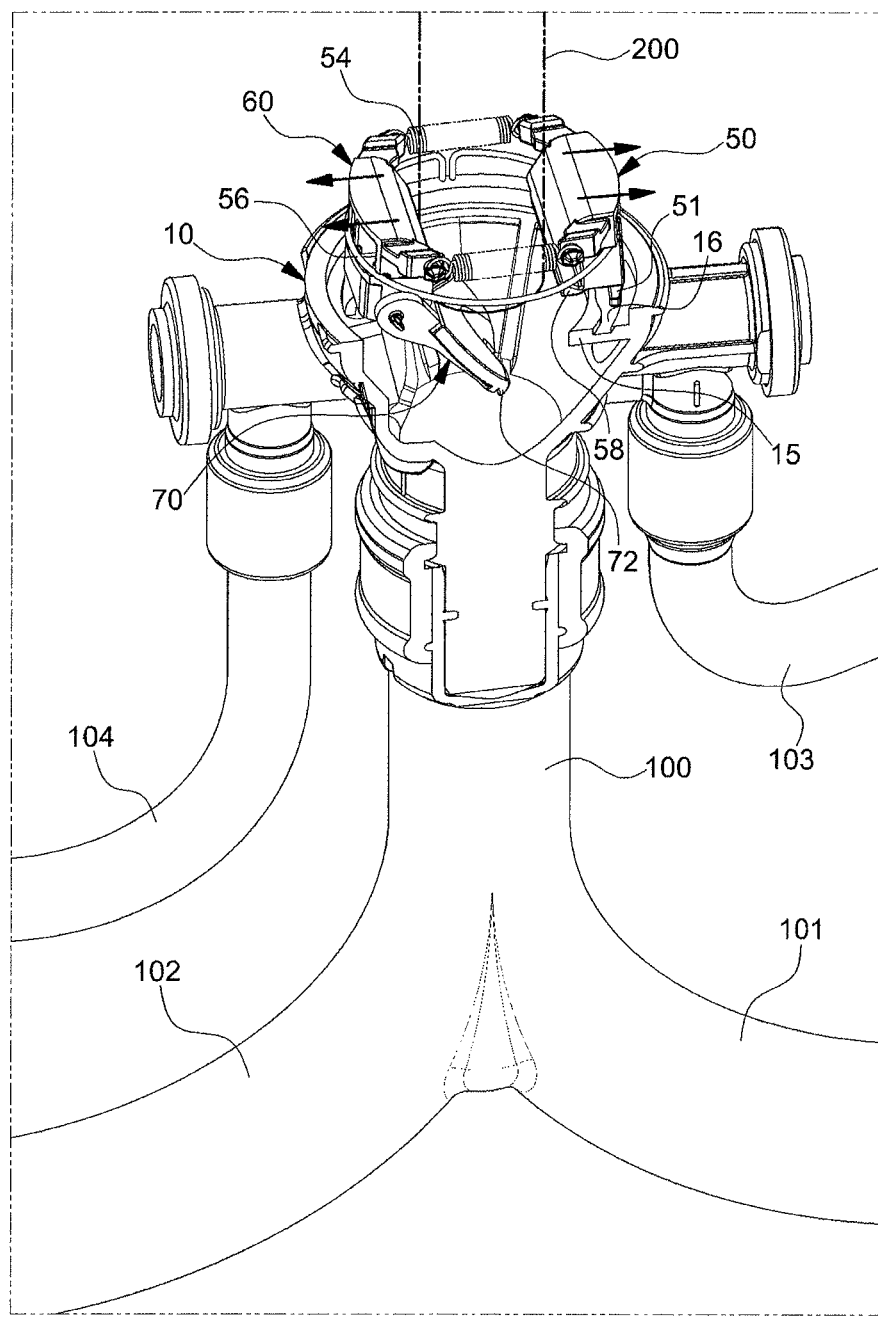

Subsequently, the driver inserts the diesel fuel filling gun 200 into the region between the guide wings 40, which have moved away from each other to a depth at which the diesel fuel filling gun 200 applies pressure to the first stopper 50 and the second stopper 60 (see FIG. 7).

At the present time, because the distance between the first stopper 50 and the second stopper 60 is smaller than the diameter (approximately 24 mm to 31 mm) of the diesel fuel filling gun 200, the first stopper 50 and the second stopper 60 are required to move backward to allow the diesel fuel filling gun 200 to pass between the first stopper 50 and the second stopper 60.

Thus, when the lower end portion of the diesel fuel filling gun 200 comes into contact with the first stopper 50 and the second stopper 60, wherein the force for inserting the diesel fuel filling gun 200 is transferred to the first stopper 50 and the second stopper 60, the first stopper 50 and the second stopper 60 are moved backward while extending the connection springs 54 and the ring spring 56.

Figure 9:
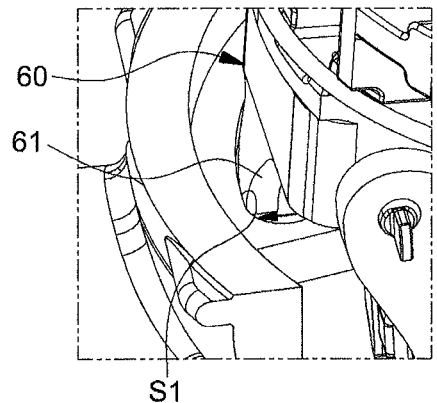
Figure 10:
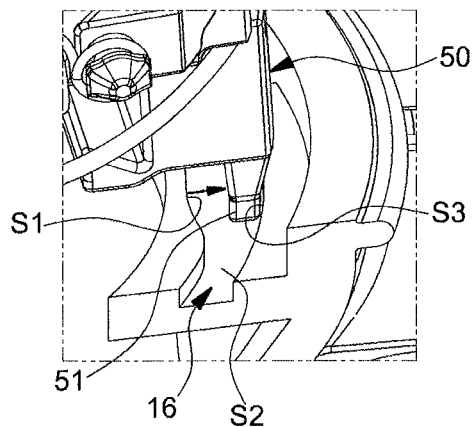
Figure 12:
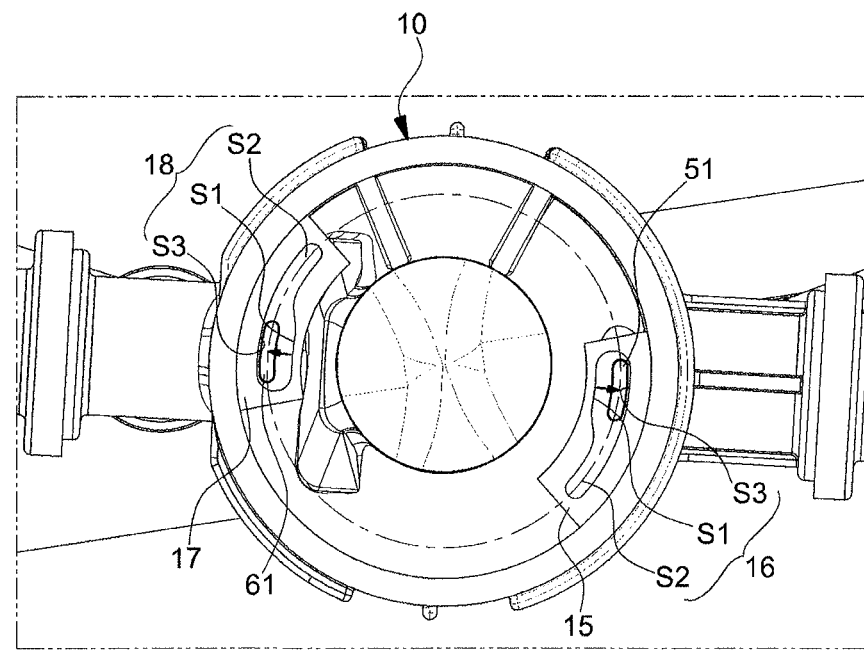

At provided time, as illustrated in FIG. 9, FIG. 10 and FIG. 12, the first protrusion 51 of the first stopper 50, which has been located in the first slide region S1 in the first slot 16, is moved backward to the forward/backward movement region S3, which is formed at the rear of the first slide region S1. Simultaneously, the second protrusion 61 of the second stopper 60, which has been located in the first slide region S1 in the second slot 18, is moved backward to the forward/backward movement region S3, which is formed at the rear of the first slide region S1. In conclusion, the first stopper 50 and the second stopper 60 are moved backward, separating from each other by a distance that allows the passage of the diesel fuel filling gun 200.

Simultaneously with the backward movement of the first stopper 50 and the second stopper 60, the rear end portion of the flap 70 remains hinged to the lower end portion of the second stopper 60, and the lock portion 72, which is formed on a front end portion of the flap 70, is separated and unlocked from the locking protrusion 58 of the first stopper 50.

Figure 8:
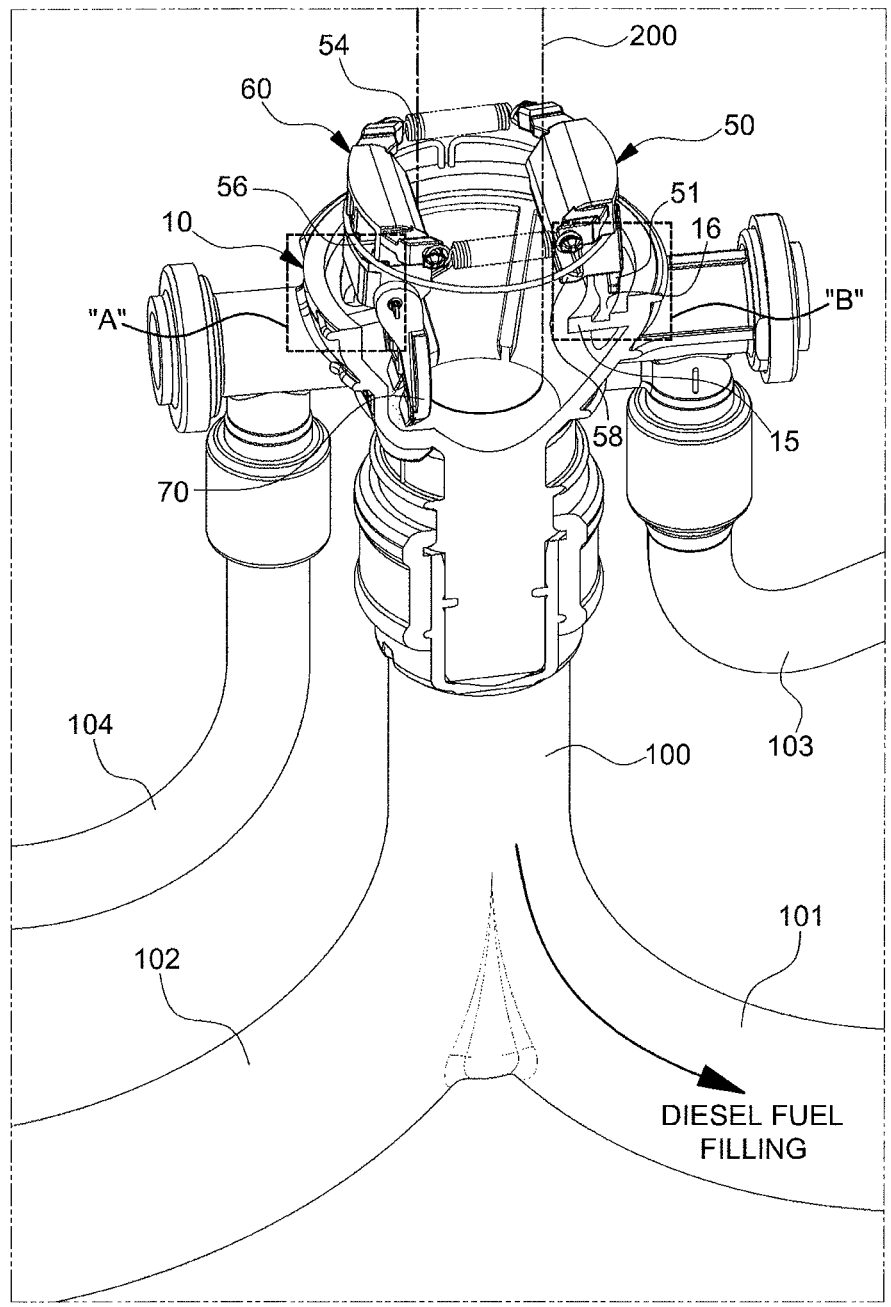

Accordingly, when the diesel fuel filling gun 200 passes between the first stopper 50 and the second stopper 60, and simultaneously applies pressure to the flap 70, the flap 70 performs a downward opening operation (FIG. 8).

At the time, because the retainer 20 has been angularly rotated in the diesel fuel filling direction, the outlet 22 formed in the lower end portion of the retainer 20 remains in communication with the diesel fuel filling pipe 101 in the integrated pipe 100.

Diesel fuel from the diesel fuel filling gun 200 may be supplied into the diesel fuel tank through the diesel fuel filling pipe 101.

Meanwhile, in the case where the urea filling gun 202 is incorrectly inserted in the diesel fuel filling mode described above, although the urea filling gun 202 may pass between the guide wings 40, the urea filling gun 202 passes through the region between the first stopper 50 and the second stopper 60 (the region which is greater than the diameter of the urea filling gun) to come into contact with the flap 70. Therefore, the driver may recognize that insertion of the urea filling gun 202 is not possible. As a result, the incorrect replenishment of urea may be easily prevented.

<Urea Filling Mode>

FIG. 13, FIG. 14, FIG. 15, FIG. 16, FIG. 17, FIG. 18, FIG. 19, and FIG. 20 illustrate the operating state of a urea filling mode in the integrated fuel-mixing prevention device configured for the diesel vehicle according to an exemplary embodiment of the present invention.

Figure 13:
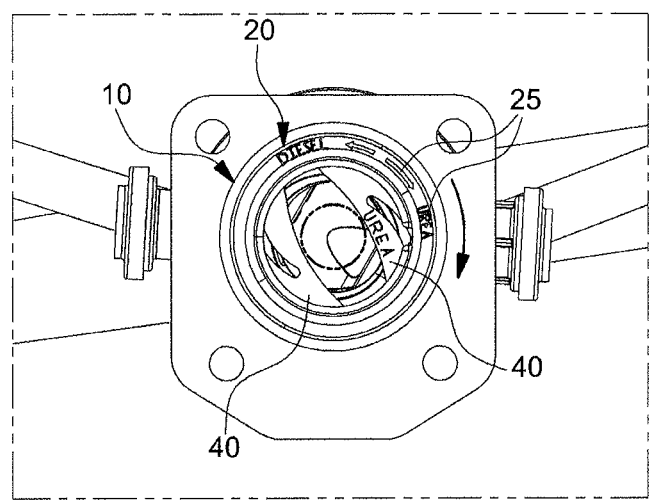
FIG. 13 is a plan view illustrating the operating state of a urea filling mode in the integrated fuel-mixing prevention device configured for the diesel vehicle according to an exemplary embodiment of the present invention.
Figure 14:
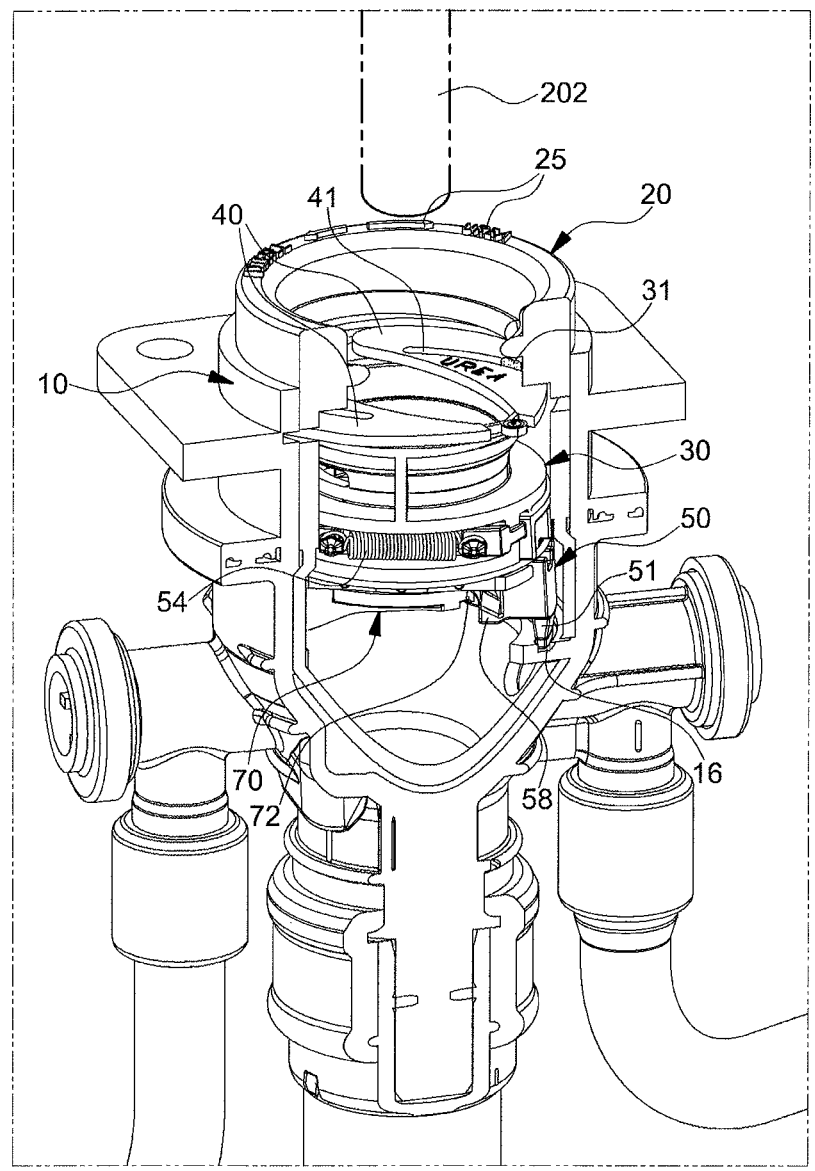
FIG. 14 is a cross-sectional view illustrating the operating state of the urea filling mode in the entire integrated fuel-mixing prevention device configured for the diesel vehicle according to an exemplary embodiment of the present invention.
Figure 15:
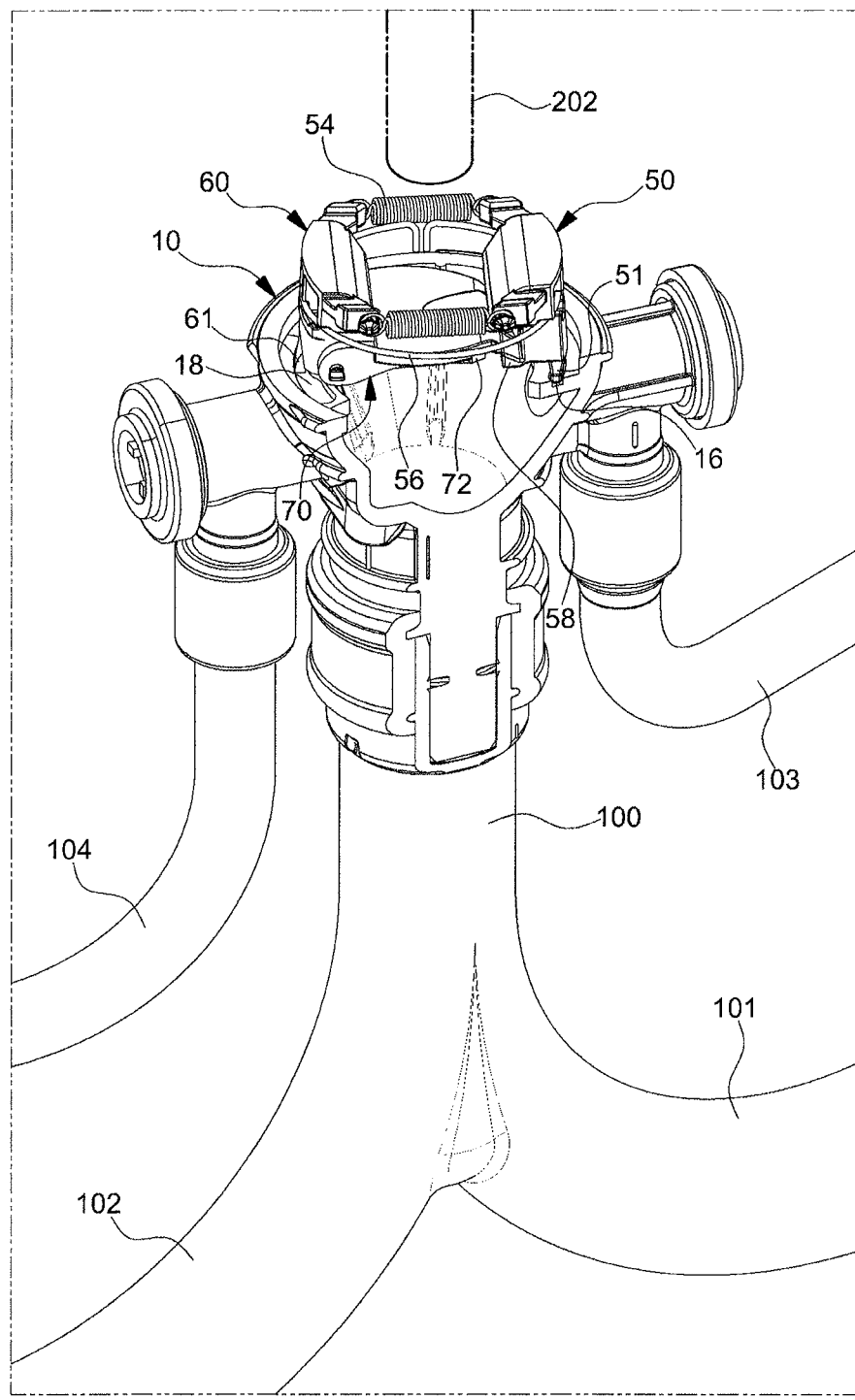
FIG. 15, FIG. 16, FIG. 17, FIG. 18, and FIG. 19 are cross-sectional views illustrating the integrated fuel-mixing prevention device configured for the diesel vehicle according to an exemplary embodiment of the present invention, from which some elements are removed to better show the operating state of the urea filling mode.

First, the driver rotates the retainer 20 in an angular rotation direction (e.g., the clockwise direction) to switch to the urea filling mode after checking the characters and arrows 25 formed on the upper surface of the retainer 20 (see FIG. 13).

When the retainer 20 is angularly rotated in the clockwise direction, the first stopper 50 and the second stopper 60, as well as the support bracket 30, are angularly rotated at the same angle.

At the present time, when the support bracket 30 is angularly rotated, the guide pins 31 of the support bracket 30 are moved inward in the guide holes 41 in the guide wings 40, causing the respective guide wings 40 to be moved toward each other. The guide wings 40 are moved toward each other until the distance therebetween reaches approximately 21 mm to allow the urea filling gun 202 (having the diameter of approximately 19 mm) to be inserted between the guide rings 40 (see FIG. 14 and FIG. 15). Of course, in the provided state, the diesel fuel filling gun (having the diameter of approximately 24 mm to 31 mm) cannot be inserted.

Figure 18:
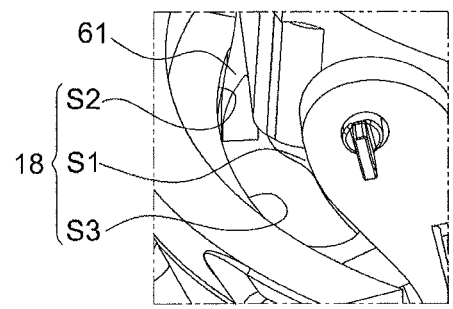
Figure 19:
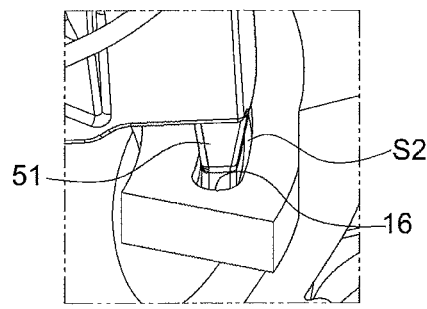
Figure 20:
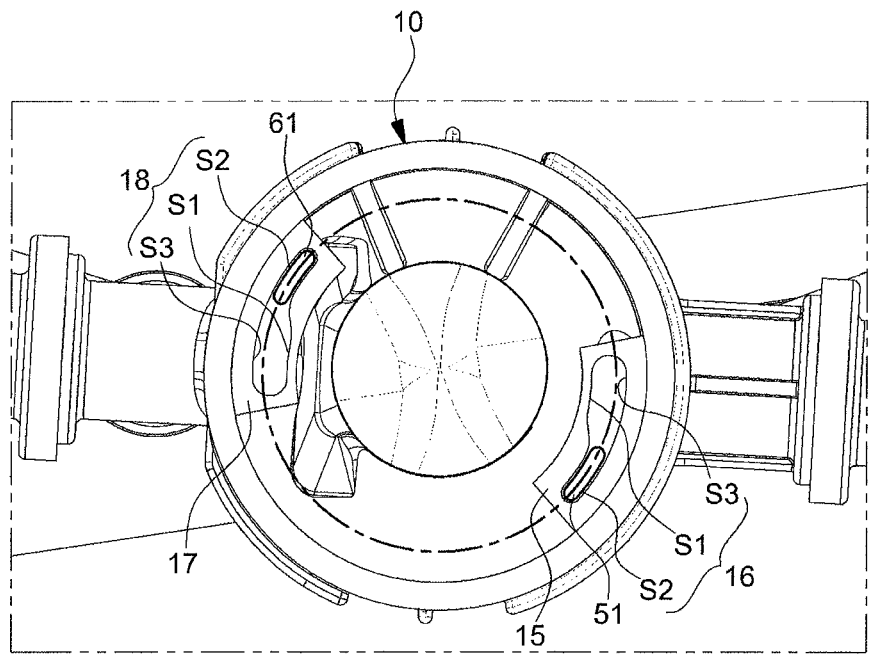
FIG. 20 is a schematic plan view illustrating the positional movement of the first protrusion of the first stopper and the second protrusion of the second stopper in the first slot and the second slot, respectively, in the urea filling mode of the integrated fuel-mixing prevention device configured for the diesel vehicle according to an exemplary embodiment of the present invention.
Figure 21:
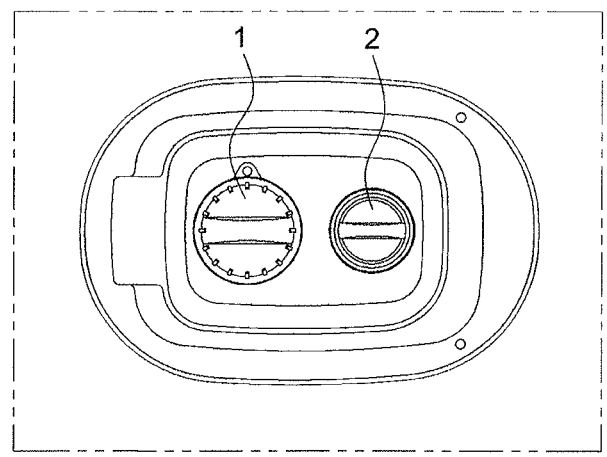
FIG. 21 is a schematic view illustrating the state in which a diesel filler neck and a urea filler neck are mounted side by side on a fuel inlet of the diesel vehicle according to the related art.

In addition, as the first stopper 50 and the second stopper 60 are angularly rotated in the clockwise direction, as illustrated in FIG. 18, FIG. 19, and FIG. 20, the first protrusion 51 formed on the lower end portion of the first stopper 50 is located in the second slide region S2 in the first slot 16, and in the same manner, the second protrusion 61 formed on the lower end portion of the second stopper 60 is located in the second slide region S2 in the second slot 18.

Since the first slide region S1 in each of the first slot 16 and the second slot 18 maintains a constant distance with respect to the internal-diameter surface of each flange 15 or 17, and the second slide region S2 is gradually increased in distance from the internal-diameter surface of each flange 15 or 17, the first protrusion 51 of the first stopper 50 and the second protrusion 61 of the second stopper 60 are consequently moved backward to the external side of each flange 15 or 17 of the filler pipe 10.

Simultaneously, because the first stopper 50 and the second stopper 60 are moved backward, the rear end portion of the flap 70 remains hinged to the lower end portion of the second stopper 60, and the lock portion 72 formed on the front end portion of the flap 70 is separated and unlocked from the locking protrusion 58 of the first stopper 50.

Figure 16:
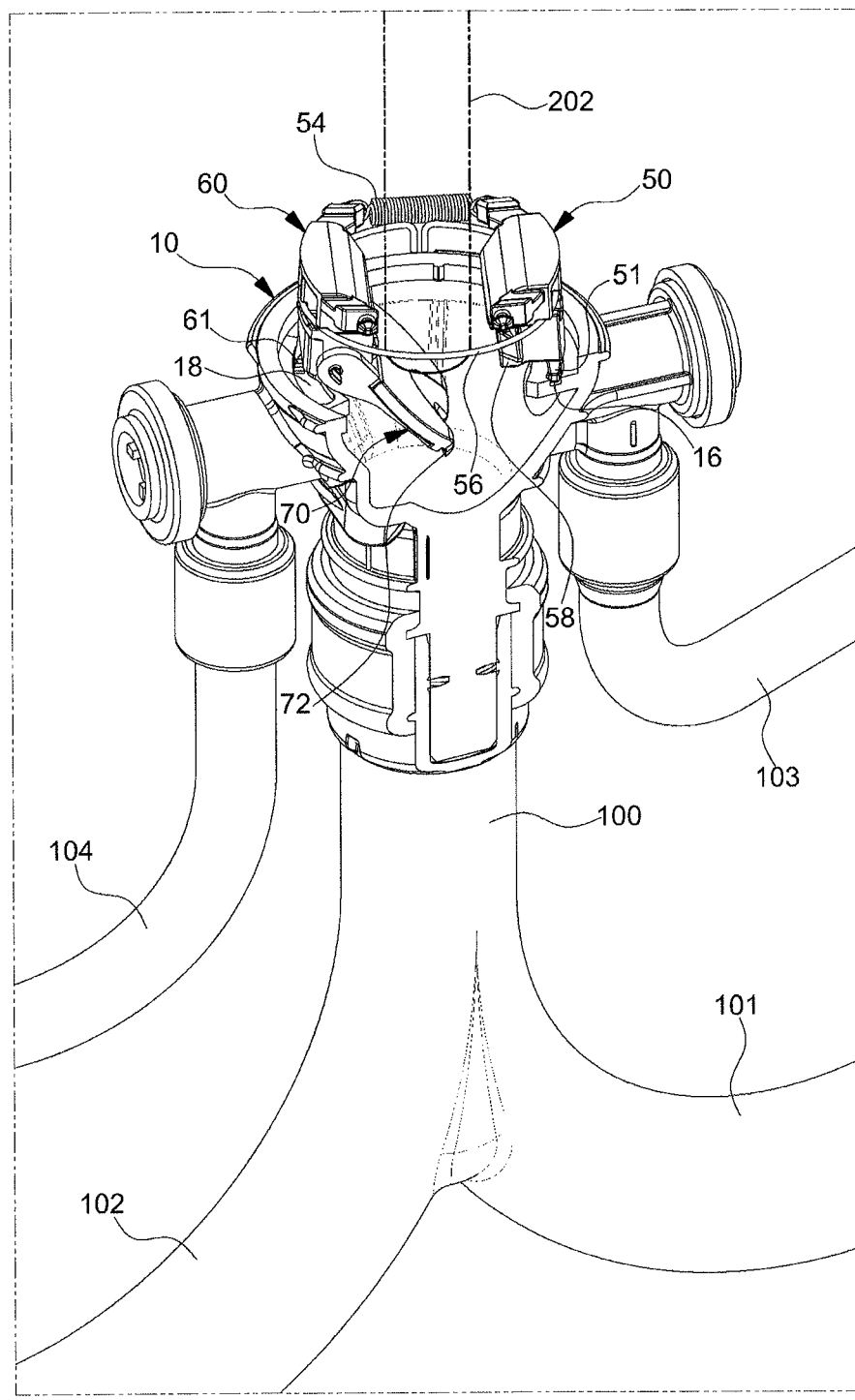
Figure 17:
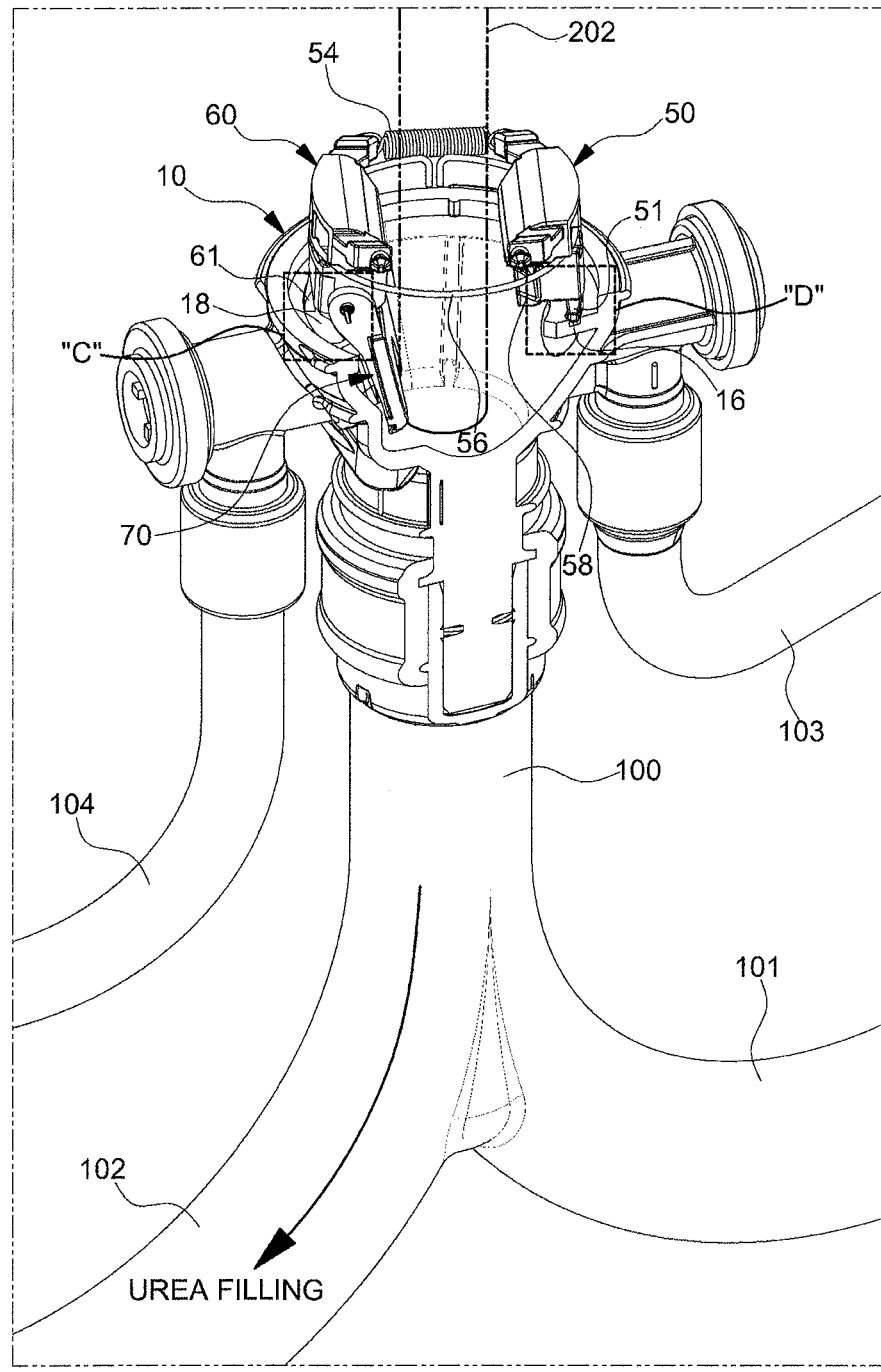

Accordingly, when the urea filling gun 202 is inserted to pass between the respective guide wings 40 until it reaches the flap 70, as illustrated in FIG. 16 and FIG. 17, a force for inserting the urea filling gun 202 is transferred to the flap 70, causing the flap 70, which has remained unlocked, to perform an opening operation.

At the present time, because the retainer 20 has been angularly rotated in the urea filling direction, the outlet 22 formed in the lower end portion of the retainer 20 remains in communication with the urea filling pipe 102 in the integrated pipe 100.

Urea from the urea filling gun 202 may be easily supplied into the urea tank through the urea filling pipe 102.

Meanwhile, in the case where the diesel fuel filling gun 200 is incorrectly inserted in the urea filling mode described above, because the distance between the guide wings 40 is approximately 21 mm at which the urea filling gun 202 (having the diameter of approximately 19 mm) may be inserted between the guide wings 40, the diesel fuel filling gun (having the diameter of approximately 24 mm to 31 mm) comes into contact with the upper surface of each guide wing 40 wherein further insertion thereof is impossible. Thus, the driver may recognize that insertion of the diesel fuel filling gun 200 is not possible. As a result, the incorrect replenishment of diesel fuel may be easily prevented.

As is apparent from the above description, various aspects of the present invention are directed to providing at least the following effects.

By integrating a diesel filler neck and a urea filler neck with each other to prevent fuel from mixing, the size of a fuel inlet may be reduced as compared to the related art, resulting in an improved external appearance.

Through the integration of the diesel filler neck and the urea filler neck, the number of assembly elements and the number of assembly processes may be reduced as compared to the related art, and a reduction in the cost and the weight may be accomplished.

By allowing only a diesel fuel filling gun to be inserted into the fuel inlet when a diesel fuel filling mode is selected and allowing only a urea filling gun to be inserted into the fuel inlet when a urea filling mode is selected, a fuel mixing an accident caused by incorrect replenishment may be prevented.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustrative and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated fuel-mixing prevention device for a diesel vehicle comprising:
    a filler pipe having a guide wing insertion groove formed in an internal-diameter surface thereof, the filler pipe being fixedly mounted to a vehicle body;
    a retainer having an inlet and an outlet formed respectively in an upper end portion and a lower end portion thereof and having a guide wing through-hole formed in an internal-diameter surface thereof, the retainer being inserted into the filler pipe to be angularly rotated;
    a support bracket having a guide pin formed on an upper surface thereof, the support bracket being inserted into the internal-diameter surface of the retainer to be angularly rotated with the retainer;
    a pair of guide wings each having a guide hole configured for insertion of the guide pin, each guide wing passing through the guide wing through-hole and being inserted into the guide wing insertion groove wherein the respective guide wings move away from or toward each other when the retainer and the support bracket are angularly rotated;
    a first stopper and a second stopper mounted on opposite side portions of the support bracket to be angularly rotated and moved forward or backward thereof; and
    a flap located between the first stopper and the second stopper to be locked or unlocked, the flap performing a downward opening operation by an insertion pressure of a diesel fuel filling gun or a urea filling gun when unlocked.

2. The integrated fuel-mixing prevention device of claim 1, wherein each of the filler pipe and the retainer has a lower portion having a smaller diameter than that of an upper portion thereof.

3. The integrated fuel-mixing prevention device of claim 1, wherein the filler pipe is integrally provided on an upper end portion thereof with a vehicle-body assembly element, and is provided on opposite side surfaces thereof with a first vapor discharge pipe and a second vapor discharge pipe, which are respectively connected to a diesel leveling tube and a urea leveling tube.

4. The integrated fuel-mixing prevention device of claim 1, wherein the retainer has a vapor discharge hole formed in the internal-diameter surface thereof, the vapor discharge hole selectively communicating with the first vapor discharge pipe and the second vapor discharge pipe of the filler pipe.

5. The integrated fuel-mixing prevention device of claim 1, wherein the retainer has a character and an arrow inscribed in an upper surface thereof to guide an angular rotation of the retainer for switching between a diesel fuel filling mode and a urea filling mode.

6. The integrated fuel-mixing prevention device of claim 1, wherein the lower end portion of the retainer, provided with the outlet, is inserted into an integrated pipe in which a diesel fuel filling pipe and a urea filling pipe are integrated with each other, and the outlet communicates with one of the diesel fuel filling pipe and the urea filling pipe when the retainer is angularly rotated.

7. The integrated fuel-mixing prevention device of claim 1, wherein the internal-diameter surface of the filler pipe is provided on opposite sides thereof with a first flange having a first slot and a second flange having a second slot, the first stopper is provided on a lower end portion thereof with a first protrusion, which is inserted into the first slot to be angularly rotated and moved forward or backward, and the second stopper is provided on a lower end portion thereof with a second protrusion, which is inserted into the second slot to be angularly rotated and moved forward or backward thereof.

8. The integrated fuel-mixing prevention device of claim 7, wherein each of the first slot and the second slot includes a first slide region, which maintains a constant distance with respect to an internal-diameter surface of each flange, a second slide region, which extends from the first slide region with a increasing distance from the internal-diameter surface of each flange, and a forward/backward movement region, which extends from a trailing end portion of the first slide region.

9. The integrated fuel-mixing prevention device of claim 1, wherein the support bracket has slide grooves formed in opposite lower portions thereof, and each of the first stopper and the second stopper has sliders integrally formed on opposite sides thereof to be movably inserted into the slide grooves in a forward or backward direction thereof.

10. The integrated fuel-mixing prevention device of claim 9, wherein the first stopper and the second stopper are connected to each other via a connection spring, and are surrounded by a ring spring while contacting with the opposite lower portions of the support bracket.

11. The integrated fuel-mixing prevention device of claim 1, wherein the respective guide wings are elastically connected to each other at first end portions thereof via a first return spring and a nipple.

12. The integrated fuel-mixing prevention device of claim 1, wherein the flap has a rear end portion, which is hinged to and elastically connected to a lower end portion of the second stopper via a second return spring.

13. The integrated fuel-mixing prevention device of claim 1, wherein the flap has a front end portion integrally provided with a lock portion, and the first stopper has a locking protrusion formed on a lower end portion thereof wherein the lock portion is accommodated on and locked by the locking protrusion.

* * * * *